United States Patent
Belsarkar

(10) Patent No.: US 9,706,264 B2
(45) Date of Patent: Jul. 11, 2017

(54) MULTIPLE FIELD-OF-VIEW VIDEO STREAMING

(71) Applicant: Robert Bosch GmbH, Stuttgart (DE)

(72) Inventor: Ajit Belsarkar, Lancaster, PA (US)

(73) Assignee: Robert Bosch GmbH, Stuttgart (DE)

( * ) Notice: Subject to any disclaimer, the term of this patent is extended or adjusted under 35 U.S.C. 154(b) by 382 days.

(21) Appl. No.: 14/174,621

(22) Filed: Feb. 6, 2014

(65) Prior Publication Data

US 2014/0218612 A1    Aug. 7, 2014

Related U.S. Application Data

(60) Provisional application No. 61/761,305, filed on Feb. 6, 2013.

(51) Int. Cl.
*H04N 21/4223* (2011.01)
*H04N 21/81* (2011.01)
*H04N 7/18* (2006.01)
*H04N 21/431* (2011.01)
*H04N 21/4385* (2011.01)
*H04N 21/4402* (2011.01)

(52) U.S. Cl.
CPC ............ *H04N 21/816* (2013.01); *H04N 7/18* (2013.01); *H04N 21/4223* (2013.01); *H04N 21/4312* (2013.01); *H04N 21/4385* (2013.01); *H04N 21/440263* (2013.01)

(58) Field of Classification Search
CPC ............ H04N 21/816; H04N 21/4385; H04N 21/4223; H04N 21/440263; H04N 21/4312; H04N 7/18
See application file for complete search history.

(56) References Cited

U.S. PATENT DOCUMENTS

| | | | | |
|---|---|---|---|---|
| 5,214,538 A | * | 5/1993 | Lobb | A61B 1/0008 359/683 |
| 5,657,073 A | * | 8/1997 | Henley | G06T 3/0062 348/38 |
| 6,097,394 A | * | 8/2000 | Levoy | G02B 27/2271 345/419 |
| 6,539,162 B1 | * | 3/2003 | Stephenson | G03B 37/02 348/36 |
| 7,499,079 B2 | | 3/2009 | Evans, Jr. et al. | |

(Continued)

FOREIGN PATENT DOCUMENTS

| | | |
|---|---|---|
| EP | 1624687 | 2/2006 |
| WO | 2012/048173 | 4/2012 |

OTHER PUBLICATIONS

Lensch et al., "Automated Texture Registration and Stitching for Real World Models," Proceedings of the 8th Pacific Conference on Computer Graphics and Applications, 2000, 13 pages.

*Primary Examiner* — Sath V Perungavoor
*Assistant Examiner* — Philip Dang
(74) *Attorney, Agent, or Firm* — Michael Best & Friedrich LLP

(57) ABSTRACT

Methods and systems for providing a single stream including multiple FoVs. One system includes an image sensor configured to receive a selection of a plurality of field-of-views from a user, capture an image associated with each of the plurality of field-of-views, stitch the image associated with each of the plurality of field-of-views into a single stream, and transmit the single stream to at least one computing device.

20 Claims, 8 Drawing Sheets

(56) References Cited

U.S. PATENT DOCUMENTS

| | | |
|---|---|---|
| 8,270,767 B2 | 9/2012 | Park |
| 8,334,692 B2 * | 12/2012 | Harvey .............. G01R 33/3415 |
| | | 324/307 |
| 2008/0106593 A1 * | 5/2008 | Arfvidsson ........... G06T 3/0062 |
| | | 348/39 |
| 2008/0211915 A1 * | 9/2008 | McCubbrey ..... G08B 13/19608 |
| | | 348/159 |
| 2009/0073265 A1 | 3/2009 | Greenhill et al. |
| 2010/0135594 A1 * | 6/2010 | Allebach ................. G06T 5/003 |
| | | 382/275 |
| 2010/0162285 A1 * | 6/2010 | Cohen ................... H04H 60/31 |
| | | 725/12 |
| 2011/0316968 A1 * | 12/2011 | Taguchi ............. H04N 5/23238 |
| | | 348/36 |
| 2012/0242698 A1 * | 9/2012 | Haddick ............ G02B 27/0093 |
| | | 345/633 |
| 2012/0242788 A1 | 9/2012 | Chuang et al. |
| 2012/0242809 A1 * | 9/2012 | White .................. G08G 1/0175 |
| | | 348/51 |
| 2012/0313781 A1 | 12/2012 | Barker et al. |

\* cited by examiner

MULTIPLE FIELD-OF-VIEW VIDEO STREAMING

RELATED APPLICATIONS

This application claims priority to U.S. Provisional Application No. 61/761,305, filed Feb. 6, 2013, the entire content of which is incorporated by reference herein.

FIELD

Embodiments of the invention relate to providing an overview perspective of an environment using a moving camera, such as a pan, tilt, and zoom ("PTZ") camera.

BACKGROUND

A single field-of-view ("FoV") from a moving camera typically does not cover all the surveillance regions the user is interested in. For example, a FoV may be approximately 50 degrees, but the user may want non-contiguous 270 degrees. When video from a camera is streamed, only one FoV is available at any time. To get multiple FoVs, the user typically uses a preset tour where the camera goes between predefined positions. Accordingly, the user loses an overall perspective of the environment being surveillance, and, in a multi-sensor camera system, a user cannot see the same FoV from multiple sensors side-by-side.

SUMMARY

Accordingly, embodiments of the invention solves the problem of providing overview perspective in a moving camera by providing an overview stream that includes multiple FoVs in a single video stream (although they can be temporally different, e.g., not synchronized in time).

For example, one embodiment of the invention provides a system for providing a single stream including multiple FoVs. The system includes an image sensor configured to receive a selection of a plurality of field-of-views from a user, capture an image associated with each of the plurality of field-of-views, stitch the image associated with each of the plurality of field-of-views into a single stream, and transmit the single stream to at least one computing device.

Another embodiment of the invention provides a method of providing an image stream. The method includes receiving, by a processing unit, a selection of a plurality of field-of-views made by a user, capturing, by the processing unit, an image associated with each of the plurality of field-of-views, wherein at least two of the plurality of field-of-views differ in time, and stitching, by the processing unit, the image associated with each of the plurality of field-of-views into a single stream. The method also includes transmitting the single stream to at least one computing device.

Other aspects of the invention will become apparent by consideration of the detailed description and accompanying drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 1b schematically illustrates a computing device included in the system of FIG. 1a.

FIG. 1c schematically illustrates an image sensor included in the system of FIG. 1a.

FIG. 1d illustrates a process of generating a multiple field-of-view video stream using the system of FIG. 1a.

DETAILED DESCRIPTION

Figure 1A:
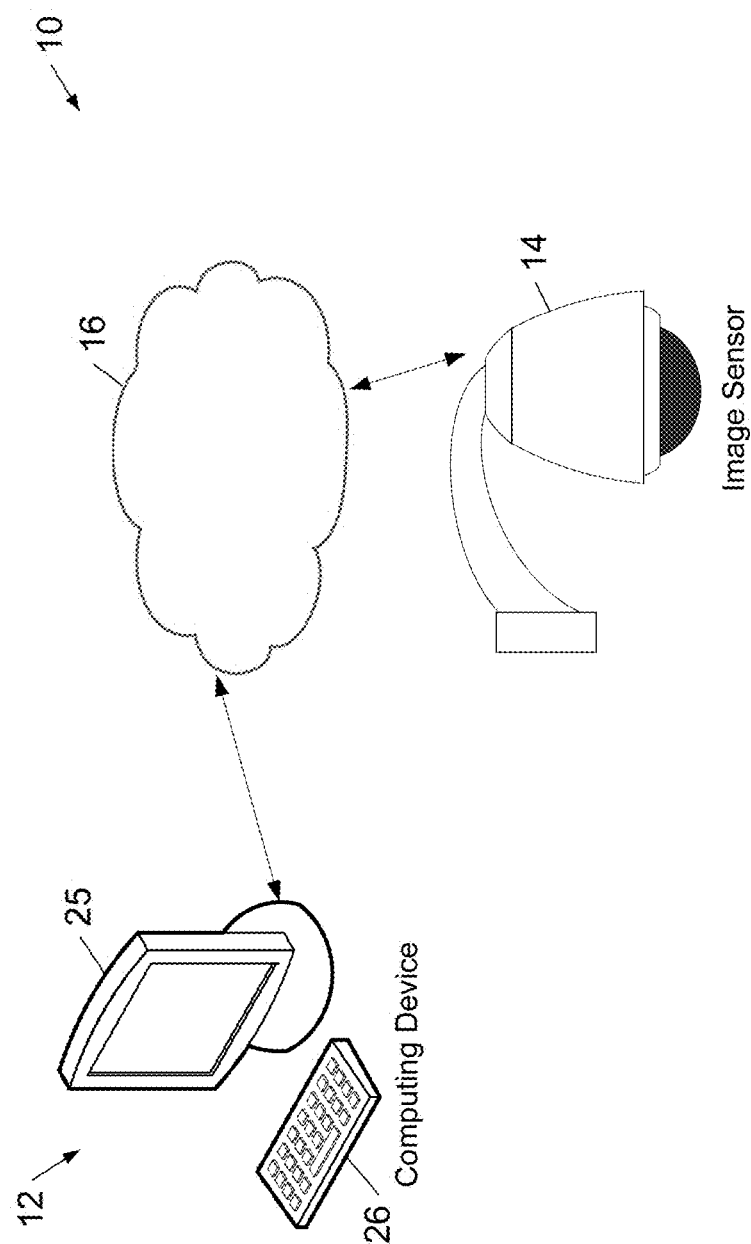
FIG. 1a schematically illustrates a system for generating a multiple field-of-view video stream.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect. Also, electronic communications and notifications may be performed using any known means including direct connections, wireless connections, etc.

It should be noted that a plurality of hardware and software based devices, as well as a plurality of different structural components may be utilized to implement the invention. Furthermore, and as described in subsequent paragraphs, the specific configurations illustrated in the drawings are intended to exemplify embodiments of the invention and that other alternative configurations are possible.

As described above, embodiments of the invention provide systems and methods for providing an overview stream that includes multiple field-of-views ("FoVs") in a single video stream. FIG. 1a illustrates a system 10 for providing such an overview stream. As illustrated in FIG. 1a, the system 10 includes a computing device 12. The system 10 also includes an image sensor 14, such as a still or video camera. The image sensor 14 can have a fixed field-of-view ("FoV") or a changing FoV. For example, in some embodiments, the image sensor 14 includes a pan, tilt, and zoom ("PTZ") video camera. The image sensor 14 monitors one or more areas for surveillance purposes.

The computing device 12 communicates with the image sensor 14 over a wired connection, a wireless connection, or a combination thereof. In some embodiments, the computing device 12 communicates with the image sensor 14 over at least one network 16. The network 16 can include a wired network, a wireless network, or a combination thereof. For example, the network 16 can include the Internet, a local area network, or a wide area network. It should be understood that although only a single image sensor 14 is illustrated in FIG. 1a, the system 10 can include multiple image sensors 14 and/or multiple computing devices 12. For example, an image sensor 14 can be configured to transmit a stitched stream (described below) to multiple computing devices 12. Similarly, a computing device 12 can receive data from multiple image sensors (e.g., over the same or different connections or networks). Also, as described above, in some embodiments, an image sensor 14 can communicate with other image sensors 14.

Figure 1B:
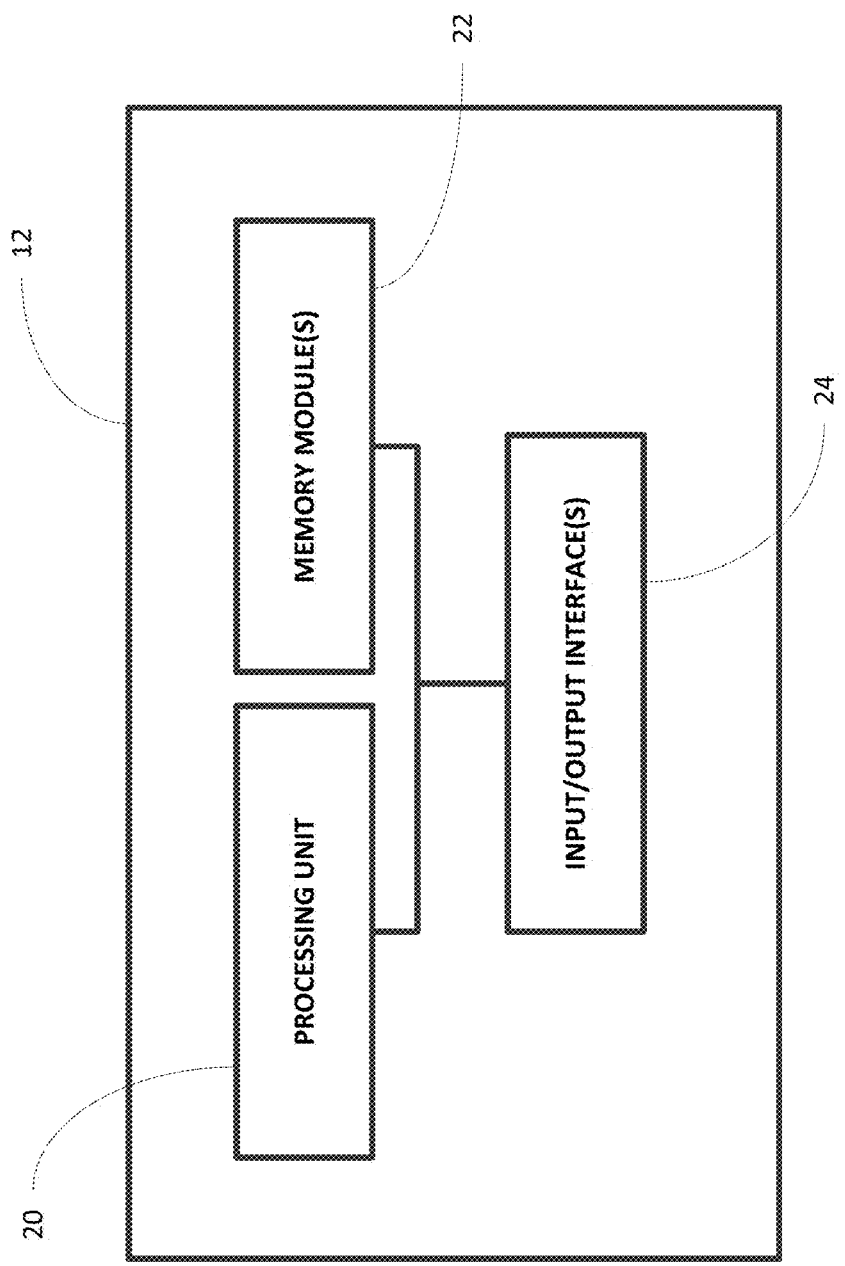

The computing device 12 can include a desktop computer, a laptop computer, a tablet computer, a smart phone, a smart watch, a smart television, or any device that allows a user to view video data streamed from the image sensor 14 (also referred to as an "image source"). The computing device 12 can be configured in a number of different ways and can include a processing unit 20 (e.g., a microprocessor, an application specific integrated circuit ("ASIC"), etc.), one or more memory modules 22, and one or more input/output interfaces 24 (see FIG. 1b).

The memory module 22 includes non-transitory computer-readable medium, such as random-access memory ("RAM") and/or read-only memory ("ROM"). The processing unit 20 retrieves instructions from the memory module 22 and executes the instructions to perform particular functionality as described in more detail below (e.g., receiving selections from a user and displaying a video stream to a user). The processing unit 20 can also retrieve and store data to the memory module 22 as part of executing the instructions.

The processing unit 20 also obtains data from external devices and systems through the input/output interface 24. For example, the input/output interface 24 connects the computing device 12 with the image sensor 14. The input/output interface 24 also allows the computing device 12 to interface with a user. For example, as illustrated in FIG. 1a, the computing device 12 also includes a monitor 25 that displays a video stream. In some embodiments, the monitor includes a touchscreen. The computing device 12 can also include one or more peripheral devices 26, such as a keyboard, joystick, mouse, stylus, printer, etc. The monitor 25 and any peripheral devices 26 can be connected to and interface with the computing device 12 through the input/output interface 24.

The image sensor 14 can include similar components as the computing device 12. For example, as illustrated FIG. 1c, the image sensor 14 can include a processing unit 30 (e.g., a microprocessor, an application specific integrated circuit ("ASIC"), etc.), one or more memory modules 32, and one or more input/output interfaces 34. The memory module 32 includes non-transitory computer-readable medium, such as random-access memory ("RAM") and/or read-only memory ("ROM"). The processing unit 30 retrieves instructions from the memory module 22 and executes the instructions to perform particular functionality as described in more detail below (e.g., receiving user selections, capturing images based on the user selections, stitching captured images into a single stream, and transmitting the stream to at least one computing device 12). The processing unit 30 can also retrieve and store data to the memory module 32 as part of executing the instructions.

The processing unit 30 also obtains data from external devices and systems through the input/output interface 34. For example, the input/output interface 34 connects the computing device 12 with the image sensor 14. In some embodiments, the input/output interface 34 also allows the image sensor 14 to interface with a user (e.g., through a touchscreen and/or one or more buttons and/or keys).

Figure 1C:
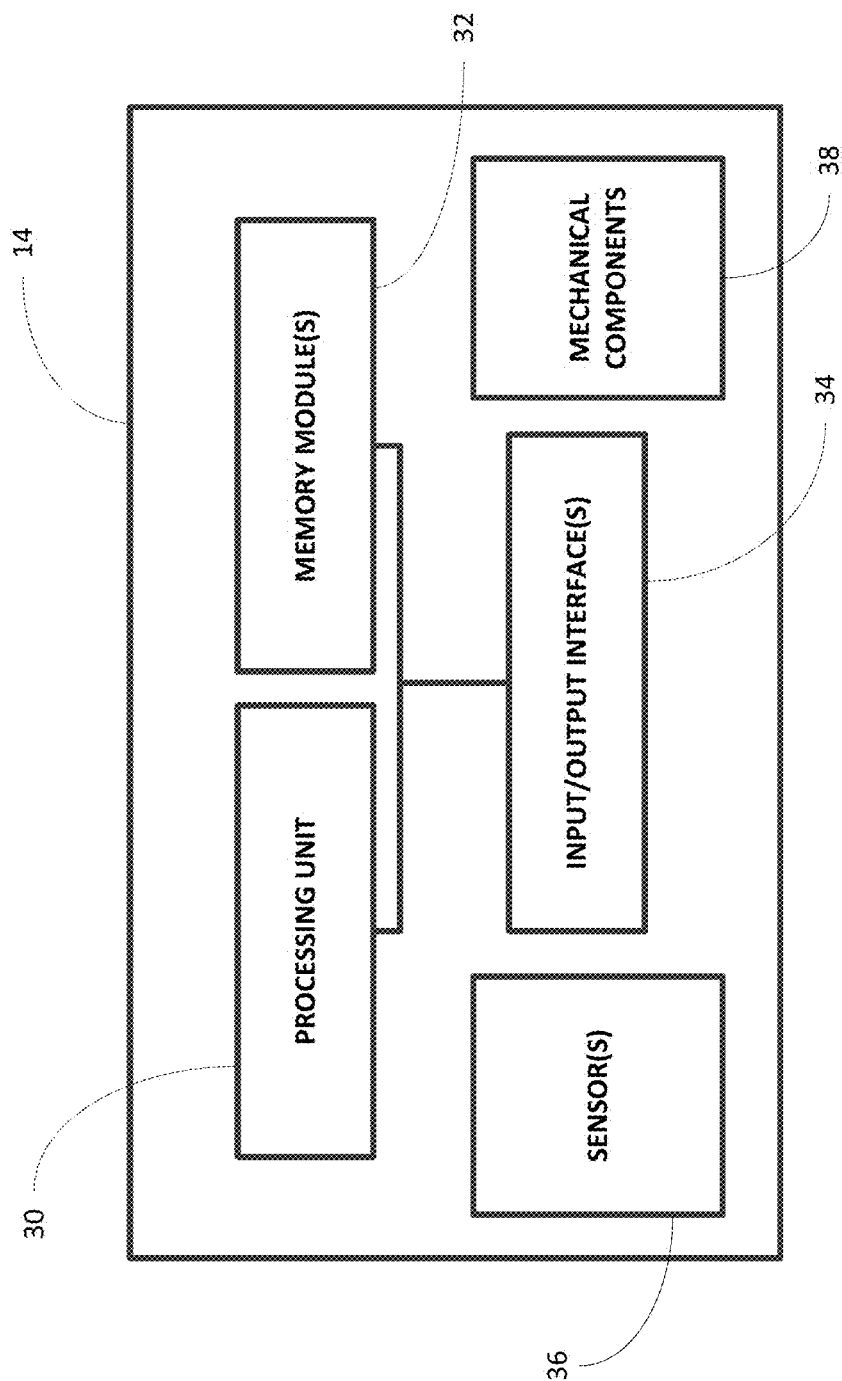

As illustrated in FIG. 1c, the image sensor 14 also includes one or more sensors 36. For example, in some embodiments, the sensors 36 include an optical sensor and a thermal sensor. The sensors 36 can also include a gamma sensor, an infrared sensor, or any other type of sensor configured to capture an image of a particular FoV. In addition, as illustrated in FIG. 1c, the image sensor 14 can include mechanical components 38 (e.g., a motor, track, etc.) used to move the sensors 36 (e.g., tilt, pan, zoom, etc.). The mechanical components 38 can be controlled by the processing unit 30 or a separate processing unit.

Figure 1D:
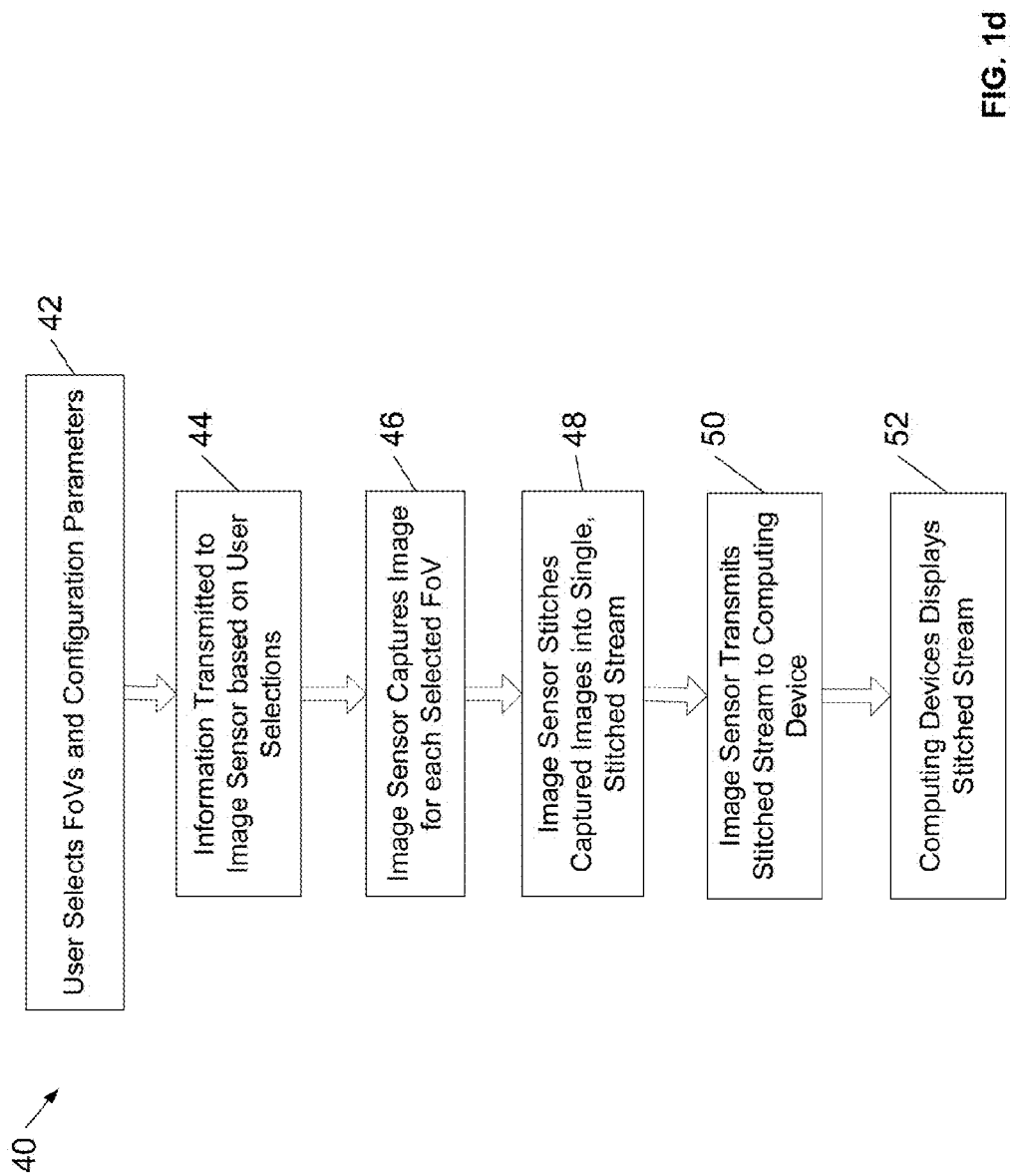

FIG. 1d illustrates a method 40 for generating a stream containing multiple FoVs using the system 10. As illustrated in FIG. 1d, the computing device 12 receives selections from the user (e.g., using the monitor 25 as a touchscreen and/or the peripheral devices 26) of multiple FoVs from candidate FoVs (at block 42). The computing device 12 also receives configuration parameters from the user, such as refresh rate, refresh choices, area, etc. In some embodiments, the computing device 12 can generate (through executing instructions stored in the memory module 22 with the processing unit 20) one or more graphical user interfaces ("GUIs") that present options to the user, including the candidate FoVs and available parameter options. It should be understood that in some embodiments, the user selects the FoVs and other parameters through the image sensor 14 rather than the computing device 12. For example, the image sensor 14 can include a touchscreen or other selection mechanisms (e.g., buttons) that allow a user to make selections.

In some embodiments, there are two modes for configuring the multi-FoV stream: a manual configuration mode and an automatic configuration mode. In the manual configuration mode, all the parameters related to the stream and the FoVs are configurable by the user. In this mode, the parameters can include a size and aspect ratio of the Multi-FoV stream. For example, the user may choose SD, HD or full HD resolution for the stream. The parameters can also include an update or refresh rate (e.g., frames per second) for the stream. For example, the user may choose to stream at a high frame rate stream such as 25, 30, 50, or 60 frames per second ("FPS") or a low frame rate stream, such as one frame per 10 seconds.

In addition to the stream parameters, a user can also configure parameters for each FoV. The parameters for the FoVs can include a size and aspect ratio of each FoV. For example, the user may assign more pixels to an important FoV in the stream as compared to other FoVs. The parameters can also include an update or refresh rate. In some embodiments, some FoVs may be more important than other FoVs. In these situations, the user can use set a more frequent update rate for the more important FoVs. The parameters can also include pan, tilt, and sensors parameters. For example, a user can set zoom, focus mode, iris mode, thermal parameters (if applicable), white balance, etc. for a particular image sensor 14.

In contrast, in the auto configuration mode, a user chooses the FoVs, but the image sensor 14 automatically adjusts the size of the FoV. For example, the image sensor 14 can apply a particular configuration policy. Once policy can include making all FoVs the same size and refresh rate. Another policy can be a current FoV policy. Using this policy, the image sensor 14 makes the size of the image associated with the current FoV (i.e., the FoV captured by the image sensor 14 at its current location) larger than the other FoVs included in the stream. (e.g., see FIG. 2). Similarly, using a video analytics or alarm-based-FoV policy. In this policy, the image sensor 14 automatically increases the size of any FoV based on a video analytic algorithm, such as people counting, motion detection, or activation of a physical alarm.

When the FoVs and parameters are set, the computing device 12 saves the user selections and transmits information to the image sensor 14 based on the selections (at block 44). In particular, the computing device 12 transmits information to the image sensor 14 specifying the FoVs selected by the user and other parameter settings (e.g., refresh rate). The image sensor 14 can also save the received information and also uses the received information to move to each selected FoV and capture an image (at block 46). The image sensor 14 then combines or stitches the images together to create one stream (at block 48). It should be understood that the image sensor 14 can use well-known image combination or stitching techniques to combine the captured images. In some embodiments, the multiple FoVs are not temporally the same but differ in time. Also, in some embodiments, the multi-FoV stream may be slower to create than a regular, single FoV stream because the camera takes a finite time to capture each FoV and stitch them together. Motor and camera parameters, such as autofocus, may also take additional processing time. However, in most situations, the stitched stream still includes multiple FoV associated with approximately the same time period (e.g., a few seconds or less).

The image sensor 14 then transmits the stitched stream to the computing device 12 (at block 50). The computing device 12 displays the stitched stream on the monitor 25 (at block 52). The image sensor 14 continues to visit each of the selected FoVs depending on the user selections, such as refresh rate.

As noted above, the computing device 12 can communicate with multiple image sensors 14. Also, in some embodiments, a single image sensor 14 can be designated as the "master" and can receive image streams from other image sensors 14. The master image sensor 14 can stitch together selected FoVs received from other image sensors 14 and then forward the stitched stream to the computing device 12 as described above. In these configurations, the computing device 12 may only communicate with one image sensor 14 but may receive a stitched stream compiled based on streams from multiple image sensors 14.

Figure 3A:
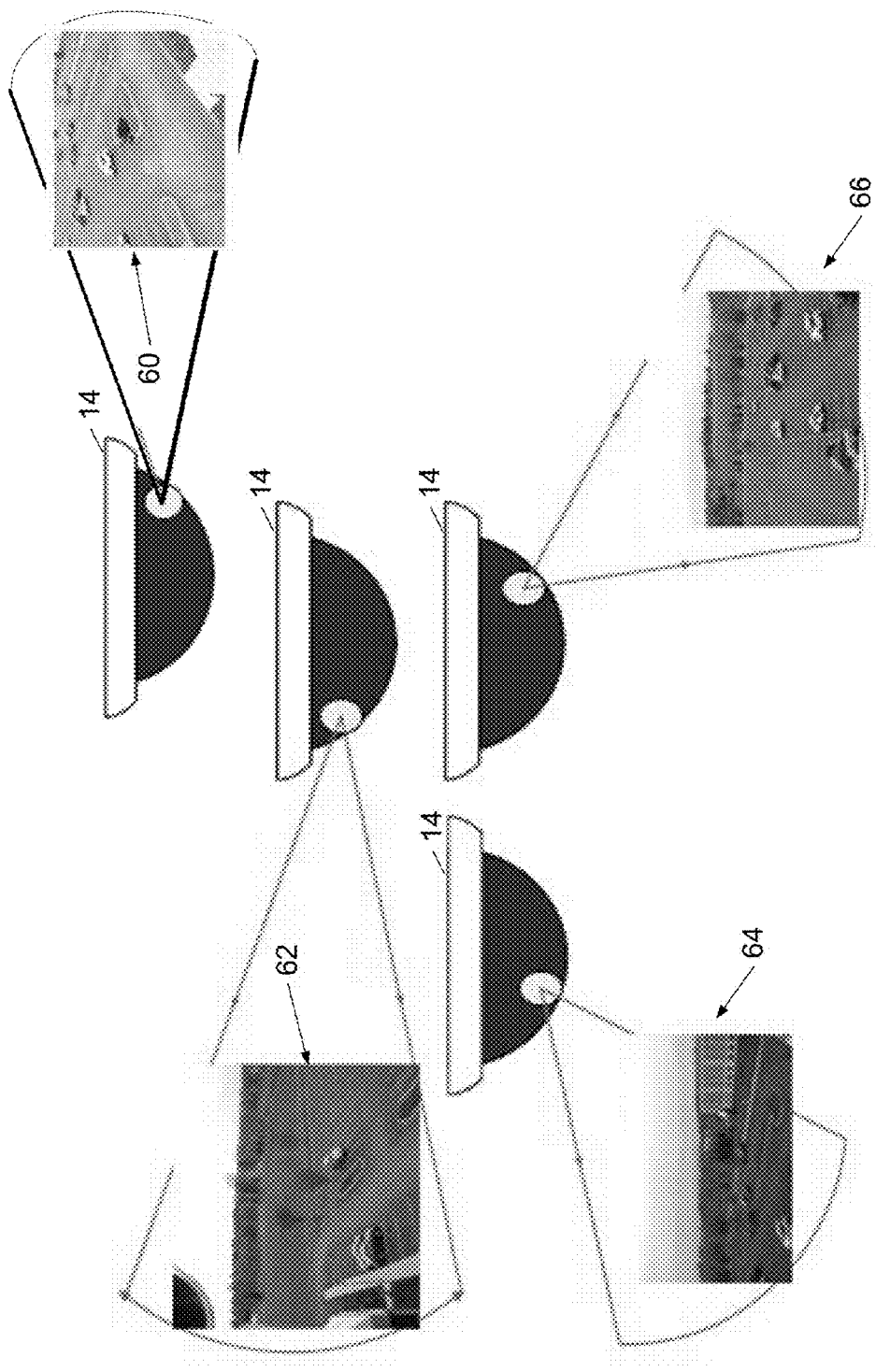
FIG. 3a illustrates multiple field-of-views of a moving camera.
Figure 3B:
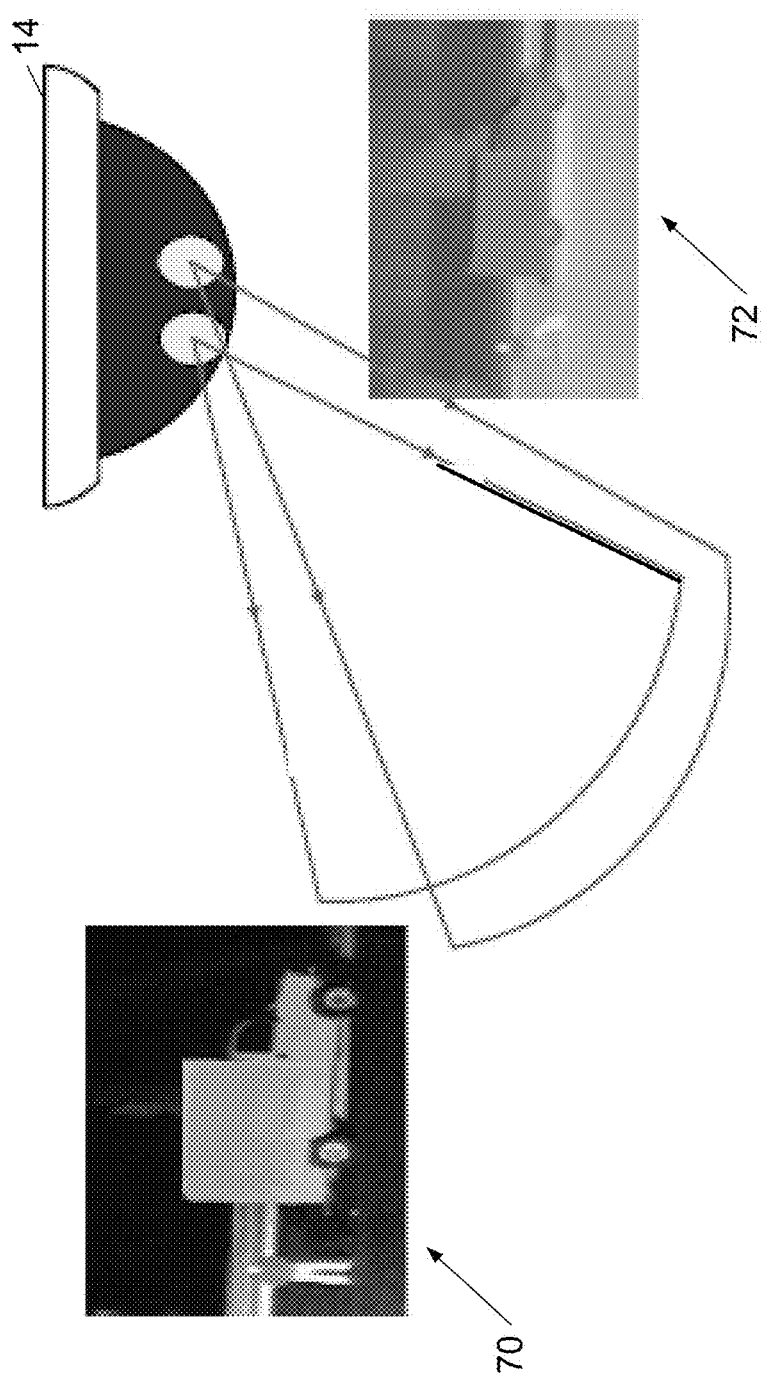
FIG. 3b illustrates two field-of-views from different image sensors.
Figure 4:
FIG. 4 illustrates a single stream containing multiple field-of-views.

For example, FIG. 3a illustrates first FoV 60, a second FoV 62, a third FoV 64, and a fourth FoV 66 provided from a single image sensor 14 (e.g., a moving camera). Each FoV 60, 62, 64, and 66 is associated with a particular position of the moving camera and each FoV 60, 62, 64, and 66 is different. Similarly, FIG. 3b illustrates a first FoV 70 and a second FoV 72 that are the represent the same FoV captured by two different sensors (e.g. a first sensor including an optical sensor and a second sensor including a thermal sensor) included in the same image sensor 14. Using the method 40 described above, a user can obtain a single stream that contains one or more of the available FoVs (e.g., as selected by the user). For example, FIG. 4 illustrates a single perspective stream 80. Because the stream is stitched by the image sensor 14, the stream 80 is provided in a single frame. Using a single frame simplifies display of the stream 80 (e.g., simplifies resizing, pausing, editing, etc.). Using the stitched stream also simplifies data storage at the computing device. For example, when multiple image sensors 14 are used, the computing device 12 can record the stitched stream 80 rather than recording each stream from each image sensor 14.

Figure 2:
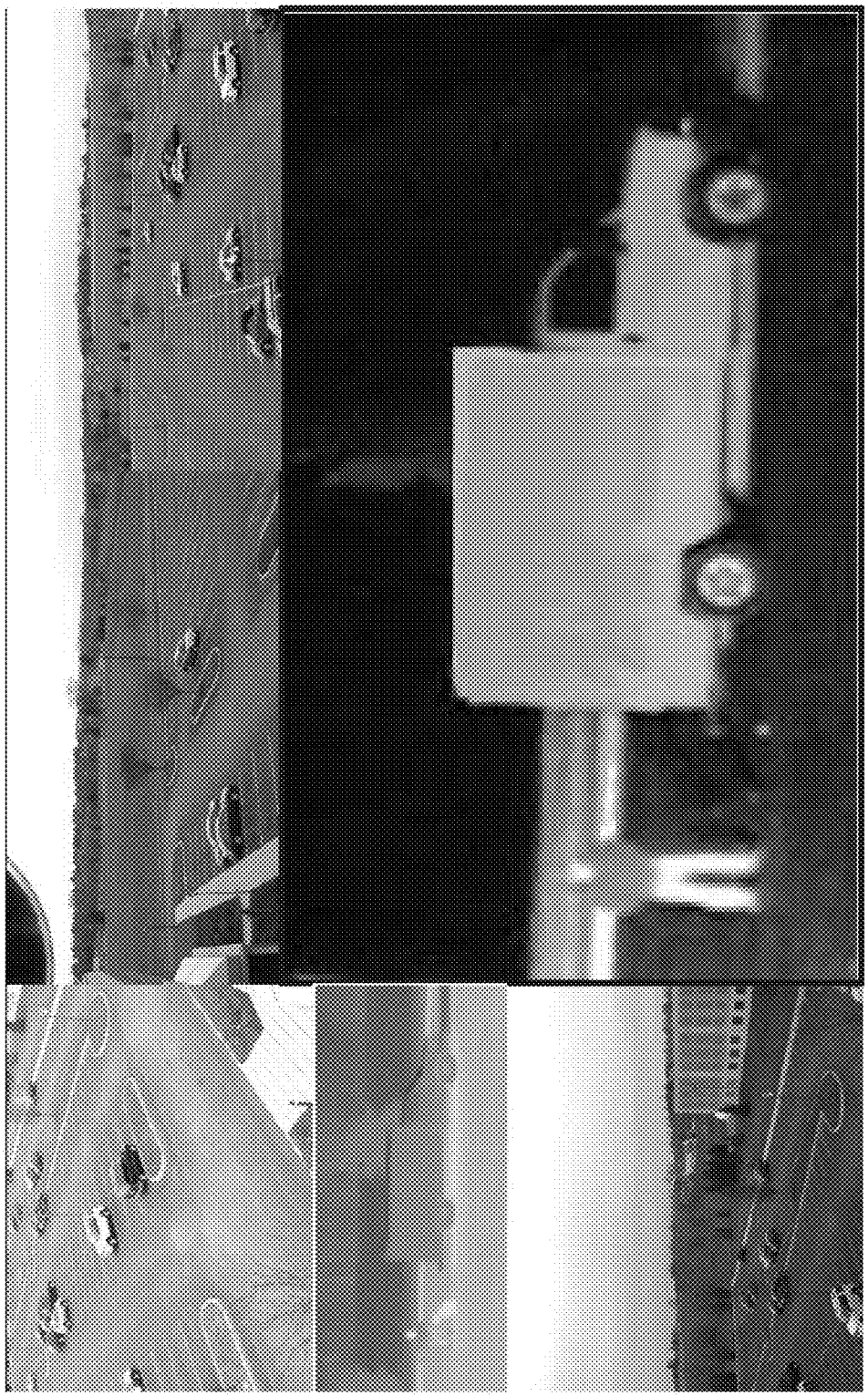
FIG. 2 illustrates a single stream containing multiple field-of-views, wherein the current or active field-of-view is enlarged.

As illustrated in FIG. 4, in some embodiments, the stitched stream 80 includes data other than just the FoVs. For example, a description can be provided for each FoV included in the stream 80 that specifies the location of the FoV (e.g., image sensor 14 positions), size, refresh rate, last refresh time, etc. The description can be added by the image sensor 14 as part of the stitched stream or can be added by the computing device 12. Also, in some embodiments, one or more of the FoVs included in the stitched stream 80 can be highlighted. For example, as illustrated in FIG. 2, the image associated with the current FoV (i.e., the FoV currently or most recently captured by the image sensor 14) can be highlighted with a border or other textual, graphical, or animation feature.

It should be understood that, in some embodiments, the computing device 12 can perform image stitching. For example, the computing device 12 can add further FoVs or other information to the stitched image received from an image sensor 14. Also, in some embodiments, the computing device 12 is configured to allow a user to change the position and/or size of one or more of the FoVs included in a received stitched image.

Accordingly, embodiments of the present invention provide methods and systems for providing a stitched stream of multiple FoVs. In some embodiments, an image sensor captures images from multiple FoVs and stitches together some or all of the FoVs into a single stitched stream. The image sensor transmits the stitched stream to a computing device and the computing device displays the stitched stream in a single frame to a user.

Various features and aspects of the invention are set forth in the following claims.

What is claimed is:

1. A system for providing an image stream, the system comprising:
    an image sensor configured to
        receive a selection of a plurality of field-of-views made by a user,
        capture a video image associated with each of the plurality of field-of-views, wherein at least two of the plurality of field-of-views differs in time,
        automatically apply a configuration policy based on at least one of a video analytic algorithm and an alarm-based field-of-view policy, the video analytic algorithm selected from a group consisting of people counting, motion detection and activation of a physical alarm within a current field-of-view, the configuration policy configured to adjust image size of each of the plurality of field-of-views, wherein the image size associated with the current field-of-view has a larger size than one or more of other field-of-views;
        stitch the video image associated with each of the plurality of field-of-views into a single stream, and
        transmit the single stream to at least one computing device.

2. The system of claim 1, wherein the image sensor includes a first sensor and a second sensor and wherein the image sensor is configured to capture a video image of one of the plurality of field-of-views using the first sensor and capture a video image of another one of the plurality of field-of-views using the second sensor.

3. The system of claim 2, wherein the first sensor includes an optical sensor and the second sensor includes a thermal sensor.

4. The system of claim 1, wherein the image sensor is further configured to apply at least one of a manual configuration mode and an automatic configuration mode to the plurality of field-of-views.

5. The system of claim 4, wherein, in applying the manual configuration mode, the image sensor receives configuration parameters from the user for at least one of the plurality of field-of-views.

6. The system of claim 5, wherein the configuration parameters include at least one selected from the group comprising an image size for at least one of the plurality of field-of-views, an aspect ratio for at least one of the plurality of field-of-views, a refresh rate for at least one of the plurality of field-of-views, a resolution for the stitched stream, and a refresh rate for the stitched stream.

7. The system of claim 5 configured to have the user set a parameter selected from a group consisting of a zoom, a focus mode, an iris mode, a thermal parameter, and a white balance associated with the image sensor.

8. The system of claim 1, wherein, in applying the automatic configuration mode, the image sensor automatically specifies configuration parameters for each of the plurality of field-of-views, wherein the configuration parameters include at least one selected from the group comprising an image size for at least one of the plurality of field-of-views, an aspect ratio for at least one of the plurality of field-of-views, and a refresh rate for at least one of the plurality of field-of-views.

9. The system of claim 8, wherein, in applying the automatic configuration mode, the image sensor automatically specifies identical configuration parameters for each of the plurality of field-of-views.

10. The system of claim 1, further comprising the computing device, wherein the computing device is configured to receive the selection from the user and display the stitched stream to the user within a single frame.

11. The system of claim 1, wherein the stitched stream includes a description for a video image for one of the plurality of field-of-views.

12. The system of claim 1, wherein one of the plurality of field-of-views representing the current field-of-view is highlighted within the stitched stream.

13. The system of claim 1, wherein a video image associated with one of the plurality of field-of-views is associated with the current field-of-view and appears larger in the stitched stream.

14. The system of claim 1, wherein video images associated with at least two of the plurality of field-of-views differ in time.

15. A method of providing an image stream, the method comprising:
   receiving, by a processing unit, a selection of a plurality of field-of-views made by a user;
   capturing, by the processing unit, a video image associated with each of the plurality of field-of-views, wherein at least two of the plurality of field-of-views differs in time;
   applying, by the processing unit, a configuration policy based on at least one of a video analytic algorithm and an alarm-based field-of-view policy, the video analytic algorithm selected from a group consisting of people counting, motion detection and activation of a physical alarm within a current field-of-view, the configuration policy including adjusting image size of each of the plurality of field-of-views, wherein the image size associated with the current field-of-view has a larger size than one or more of other field-of-views;
   stitching, by the processing unit, the video image associated with each of the plurality of field-of-views into a single stream; and
   transmitting the single stream to at least one computing device.

16. The method of claim 15, wherein capturing the video image associated with each of the plurality of field-of-views includes capturing a video image of one of the plurality of field-of-views using an optical sensor and capturing a video image of one of the plurality of field-of-views using a thermal sensor.

17. The method of claim 15, further comprising receiving configuration parameters, by the processing unit, made by a user.

18. The method of claim 17, wherein receiving the configuration parameters includes receiving at least one selected from the group comprising an image size for at least one of the plurality of field-of-views, an aspect ratio for at least one of the plurality of field-of-views, a refresh rate for at least one of the plurality of field-of-views, a resolution for the stitched stream, and a refresh rate for the stitched stream.

19. The method of claim 15, further comprising display the stitched stream on a monitor within a single frame.

20. The method of claim 15, further comprising automatically, by the processing unit, increasing a size of a video image associated with one of the plurality of field-of-views based on a video analytic algorithm.

* * * * *